United States Patent
Moosberg

(10) Patent No.: US 6,974,100 B2
(45) Date of Patent: Dec. 13, 2005

(54) MAGNETIC BRAKE FOR BRAKING A LINE SPOOL OF A FISHING REEL

(75) Inventor: Börje Moosberg, Mörrum (SE)

(73) Assignee: Pure Fishing, Inc., Spirit Lake, IA (US)

( * ) Notice: Subject to any disclaimer, the term of this patent is extended or adjusted under 35 U.S.C. 154(b) by 0 days.

(21) Appl. No.: 10/767,735

(22) Filed: Jan. 30, 2004

(65) Prior Publication Data

US 2004/0182961 A1  Sep. 23, 2004

(30) Foreign Application Priority Data

Feb. 12, 2003 (SE) .................................. 0300371

(51) Int. Cl.[7] .............................................. A01K 89/02
(52) U.S. Cl. ....................... 242/288; 242/303; 242/304
(58) Field of Search ............................... 242/288, 285, 242/286, 289, 303, 304

(56) References Cited

U.S. PATENT DOCUMENTS 4,580,742 A  4/1986  Moosberg et al.

5,273,235 A  * 12/1993  Sato ........................... 242/288

* cited by examiner

*Primary Examiner*—Kathy Matecki
*Assistant Examiner*—Evan Langdon
(74) *Attorney, Agent, or Firm*—Roylance, Abrams, Berdo & Goodman, LLP

(57) ABSTRACT

An induction type magnetic brake for braking a line spool of a fishing reel having a frame, in which the line spool is supported rotatably about an axis of rotation, and two side plates which are mounted on the frame, the line spool having an end wall fixedly connected thereto and extending perpendicular to the axis of rotation, has a plurality of permanent magnets for inductive cooperation with the end wall of the line spool and a magnet support carrying the magnets and located between one of the side plates and the end wall of the line spool. The magnet support carries the magnets in a first plane perpendicular to the axis of rotation. A shielding plate is arranged in a second plane perpendicular to the axis of rotation and located between the first plane and the end wall of the line spool. The magnet support and the shielding plate are movable perpendicular to the axis of rotation and relative to each other to different relative positions, in which the shielding plate covers the magnets to different degrees.

28 Claims, 6 Drawing Sheets

MAGNETIC BRAKE FOR BRAKING A LINE SPOOL OF A FISHING REEL

FIELD OF THE INVENTION

The present invention relates to an induction type magnetic brake for braking a line spool of a fishing reel.

A magnetic brake of this type is used for braking the line spool during casting, thereby to prevent rotation of the line spool at a speed higher than the payout speed of the line, which usually results in backlash with consequent tangling of the line.

BACKGROUND ART

A magnetic brake of this type is known from, for instance, U.S. Pat. No. 4,580,742. This known magnetic brake has a plurality of permanent magnets for inductive cooperation with the line spool and a magnet support carrying the magnets. In this known magnetic brake, the braking effect of the brake on the line spool is controlled like in most prior-art magnetic brakes of this kind by the magnet support being displaced in the axial direction of the line spool shaft. This displacement is brought about by turning an adjusting knob. When the braking effect of the brake on the line spool is to be increased, the magnet support is displaced towards the line spool, and when this braking effect is to be reduced, the magnet support is displaced away from the line spool. If a reasonable adjusting range of the braking effect of the magnetic brake on the line spool is to be obtained, the range of displacement of the magnet support must be fairly great, and consequently the magnet support must be given a large space in the fishing reel, at least seen in the axial direction. This requires, in turn, that the fishing reel be given large dimensions. A further drawback is that the magnetic brake exerts a certain braking effect on the line spool even when the magnet support is displaced to its position furthest away from the line spool, i.e. the braking effect cannot be fully canceled.

SUMMARY OF THE INVENTION

The object of the present invention is to provide a magnetic brake, which requires but little space and thus makes it possible to reduce the axial extent of the fishing reel and the construction of which makes it possible to easily completely cancel the braking effect of the magnetic brake on the line spool.

According to the invention, this object is achieved by an induction type magnetic brake for braking a line spool of a fishing reel having a frame, in which the line spool is supported rotatably about an axis of rotation, and two side plates which are mounted on the frame, the line spool having a end wall fixedly connected thereto and extending perpendicular to the axis of rotation, said magnetic brake having a plurality of permanent magnets for inductive cooperation with the end wall of the line spool and a magnet support carrying the magnets and located between one of said side plates and the end wall of the line spool, said magnetic brake being characterized in that the magnet support carries the magnets in a first plane perpendicular to the axis of rotation, and a shielding plate is arranged in a second plane which is perpendicular to the axis of rotation and located between the first plane and the end wall of the line spool, the magnet support and the shielding plate being movable perpendicular to the axis of rotation and relative to each other to different relative positions, in which the shielding plate covers the magnets to different degrees.

In a preferred embodiment, the magnet support and the shielding plate are movable perpendicular to the axis of rotation and relative to each other between a first relative position, in which the shielding plate is positioned straight in front of the magnets and completely shields the magnets in order to cancel their inductive cooperation with the end wall of the line spool, and a second relative position, in which the shielding plate is moved aside and completely uncovers the magnets.

The magnet support and the shielding plate are suitably turnable about the axis of rotation relative to each other to their different relative positions. In this case, the magnet support preferably carries the magnets in such a manner that they are located at essentially the same radial distance from the axis of rotation.

An operating means, which is turnable about an axis parallel to the axis of rotation, is advantageously mounted on said one side plate and operable from the outside thereof and has a first tooth element meshing with a second tooth element which is arranged on one of the magnet support and the shielding plate, for providing, on turning of the operating means, relative turning of the magnet support and the shielding plate about the axis of rotation.

The magnet support is preferably attached to said one side plate while the shielding plate is movable perpendicular to the axis of rotation.

BRIEF DESCRIPTION OF THE DRAWINGS

The invention will now be described in more detail by means of a preferred embodiment and with reference to the accompanying drawings, in which.

DESCRIPTION OF A PREFERRED EMBODIMENT

Figure 1:
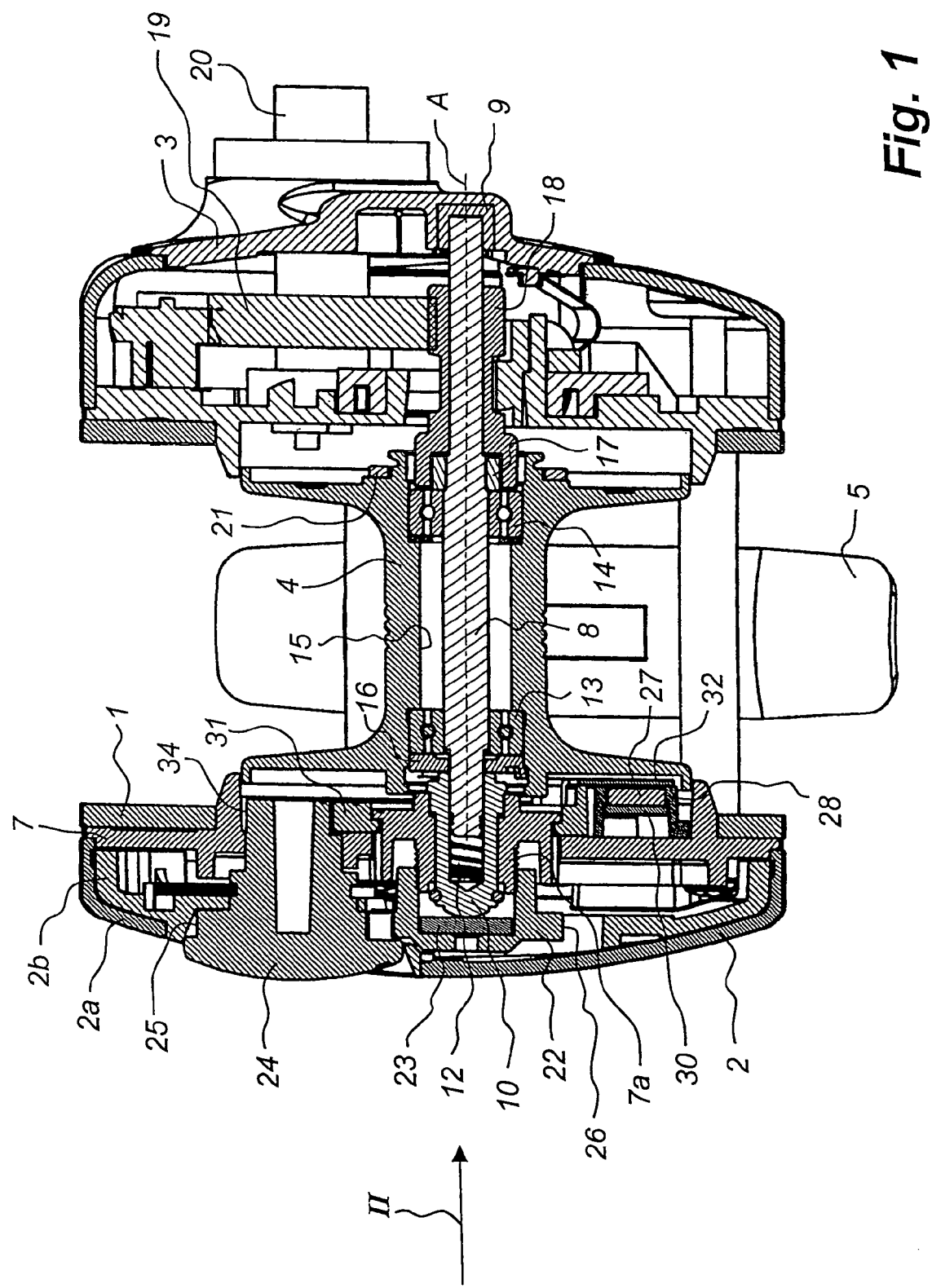
FIG. 1 is a longitudinal section along line I—I in FIG. 2 and shows a fishing reel provided with a magnetic brake according to the present invention, the magnetic brake being shown in a first position.

The multiplier type fishing reel shown in FIG. 1 has a frame 1, two side plates 2 and 3, a line spool 4 mounted in the frame 1 for receiving a line (not shown) and a foot 5 for mounting the fishing reel on a fishing rod (not shown).

Figure 3:
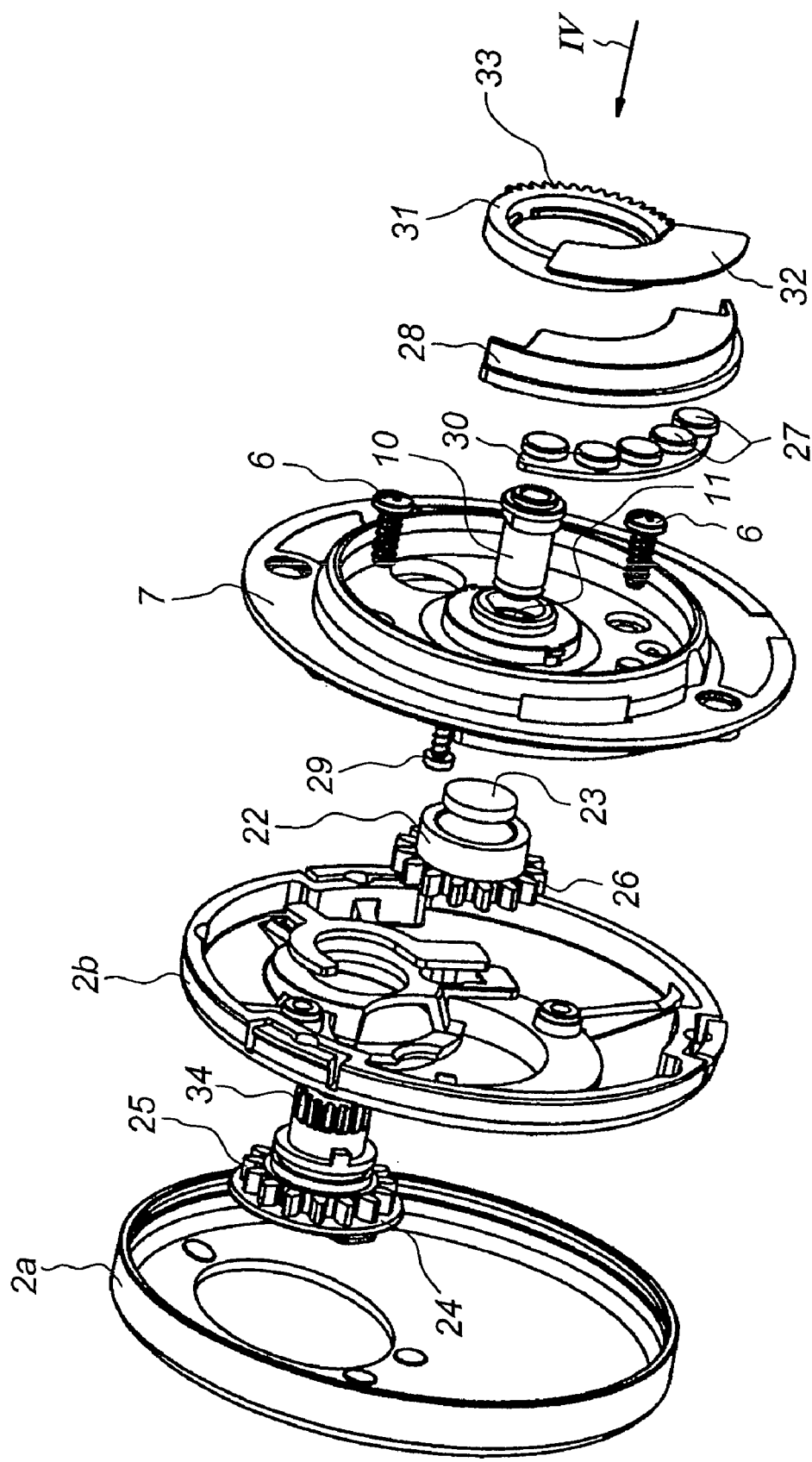
FIG. 3 is an exploded view and shows some of the components of the fishing reel shown in FIG. 1.

The right side plate 3, which will not be described in detail here, is screwed to the frame 1. The left side plate 2 consists of a cap-shaped outer part 2a and a cap-shaped inner part 2b, to which the outer part 2a is snapped on. The inner part 2b is attached by means of screws 6 (FIG. 3) to a mounting plate 7 which in turn is screwed to the frame 1.

A line spool shaft 8 is at its one end inserted into a cup-shaped sleeve 9 which is fixed in the right side plate 3, and at its other end inserted into a cup-shaped sleeve 10 extending through the mounting plate 7. The sleeve 10 is non-rotatably but axially displaceably mounted in a through hole 11 (FIG. 3) in an externally threaded hub portion 7a projecting to the left and positioned on the mounting plate 7, the bottom end of the sleeve 10 extending beyond the mounting plate. A compression spring 12 is arranged in the sleeve 10 between the bottom thereof and the end of the line spool shaft 8.

The line spool 4 is rotatably supported on the shaft 8 by means of two ball bearings 13 and 14 which are mounted a distance into the line spool 4 in a central through opening 15 in the same. The line spool 4 is rotatable about the axis of rotation A defined by the line spool shaft 8. A friction washer 16, which is non-rotatably connected to the line spool 4, is arranged in the central opening 15 axially outside the left ball bearing 13. A sleeve 17 is fixed to the shaft 8 axially outside the ball bearing 14.

A coupling means in the form of a toothed coupling sleeve 18 is rotatably and axially displaceably mounted on the shaft 8. The coupling sleeve 18 meshes at its right end with a drive gear 19 which is non-rotatably mounted on a drive shaft 20 which is rotatable by means of a handle (not shown). The coupling sleeve 18 is shown in FIG. 1 in a coupling position, in which the left end thereof is in prior-art manner drivingly engaged with a coupling ring 21 non-rotatably connected to the line spool 4. When a cast is to be made, the coupling sleeve 18 is displaced in prior-art manner by means of an operating key (not shown) to the right to a disengaged position, in which it is drivingly disengaged from the coupling ring 21. When the coupling sleeve 18 is in its disengaged position, the line spool 4 can rotate freely on the shaft 8. When starting to rotate the handle in the direction of retrieval, i.e. the direction in which that part of a line fixed to the line spool 4 which has been reeled out during casting, is again wound onto the spool, the coupling sleeve 18 is in prior-art manner automatically returned to its coupling position for rotating the line spool 4.

The fishing reel has a mechanical brake for braking the line spool 4 during casting. This mechanical brake, whose braking effect on the line spool 4 is independent of the speed of rotation thereof and which comprises the friction washer 16 and the cup-shaped sleeve 10, is adjustable with the aid of an adjusting means in the form of a cup-shaped sleeve 22 which is internally threaded and screwed to the hub portion 7a of the mounting plate 7. A disk 23 made of an elastic material, such as rubber, is placed in the sleeve 22 and abuts against the bottom thereof. The sleeve 22 is arranged to press, by way of the disk 23, the sleeve 10 into frictional engagement with the friction washer 16. The power by which the sleeve 10 is pressed against the friction washer 16 and, thus, the braking effect of the mechanical brake on the line spool 4 are adjusted by rotation of the sleeve 22. The sleeve 22 is rotated with the aid of an operating means in the form of an adjusting knob 24, which is mounted in the left side plate 2 and turnable about an axis parallel to the axis of rotation A. The adjusting knob 24 has an outer first toothing 25 which meshes with an outer toothing 26 of the sleeve 22, thereby, in turning of the adjusting knob 24, making the sleeve 22 rotate for adjusting the braking effect of the mechanical brake on the line spool 4.

Figure 2:
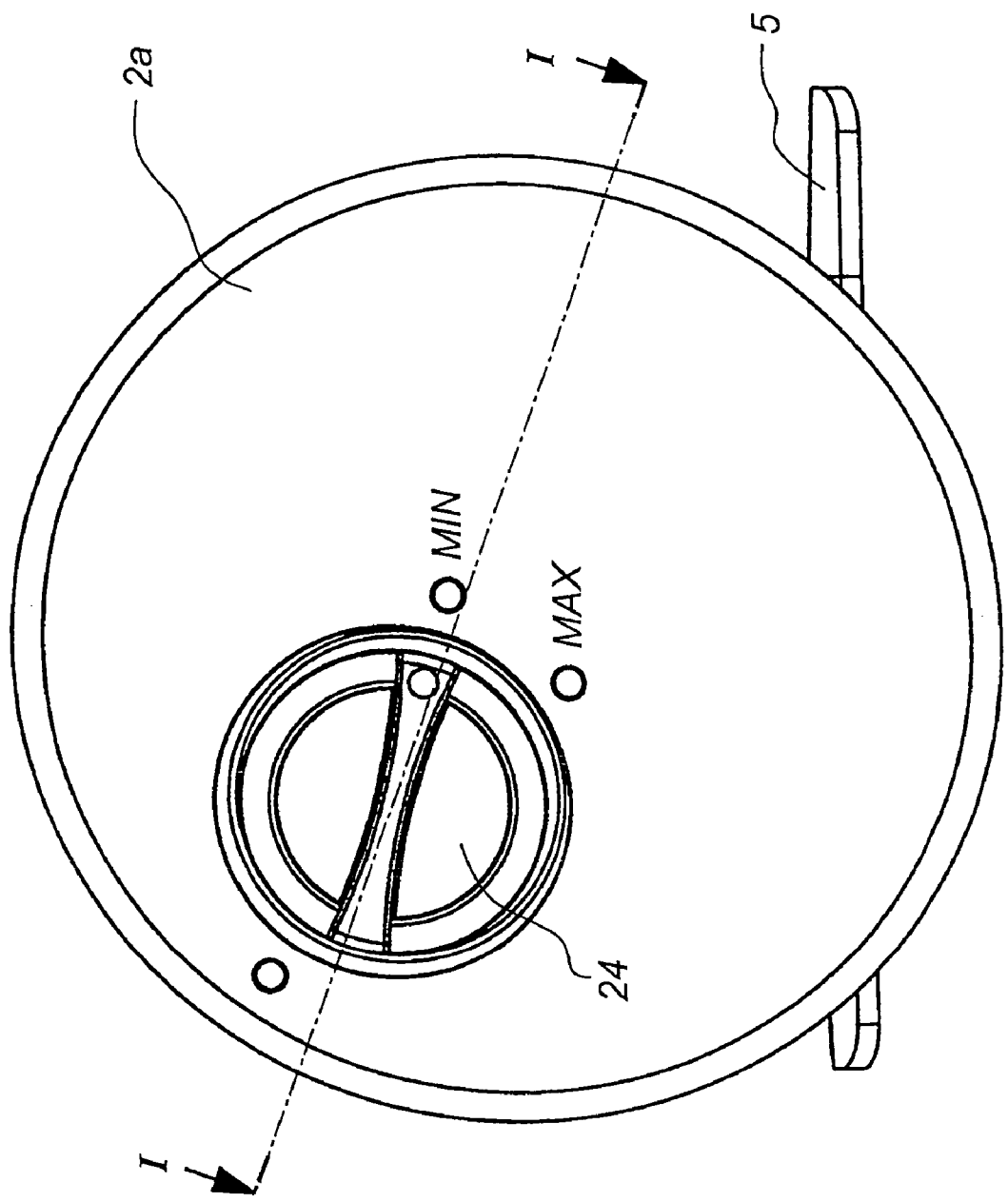
FIG. 2 is an end view and shows the fishing reel in the direction of arrow II in FIG. 1.

The adjusting knob 24 is turnable between a first position (MIN), in which it is shown in FIG. 2 and in which the braking effect of the mechanical brake on the line spool 4 is canceled, and a second position (MAX), which differs from the first position in a counter-clockwise direction (with respect to FIG. 2) by about 320°, and in which the braking effect of the mechanical brake on the line spool 4 is at its maximum.

The fishing reel also has an induction type magnetic brake for braking the line spool 4 during casting. The line spool 4, which in this example is made of aluminum, has at each end an end wall 4a, 4b perpendicular to the shaft 8. The magnetic brake, whose braking effect on the line spool 4 is dependent on the speed of rotation thereof, has a plurality of permanent magnets 27 for inductive cooperation with the left end wall 4a of the line spool 4. The magnets 27 are carried by an arcuate magnet support 28, which by means of screws 29 is fixed to the mounting plate 7 close to the end wall 4a. The magnet support 28 is in this example made of a plastic material and has an arcuate recess, whose opening faces the mounting plate 7. The magnets 27 are flat and circular-cylindrical and are arranged in this recess, in which they are kept in place in a first plane perpendicular to the axis of rotation A by an arcuate cover plate 30 made of iron. The magnets 27 are distributed along a circular arc and are thus located at the same radial distance from the axis of rotation A. The magnetic brake has an adjusting means, which consists of a wheel 31 which is turnably mounted on the mounting plate 7 and coaxial with the line spool shaft 8, and, attached to the wheel, an arcuate shielding plate 32 made of iron, which is arranged in a second plane, perpendicular to the axis of rotation A, between the magnets 27 and the end wall 4a of the line spool 4. The wheel 31 has, along part of its circumference, an external toothing 33, which meshes with an external second toothing 34 of the adjusting knob 24. The arcuate recess of the magnet support 28, the arcuate cover plate 30, the arcuate shielding plate 32 and the toothing 33 of the wheel 31 have an extent of about 110°.

Figure 4:
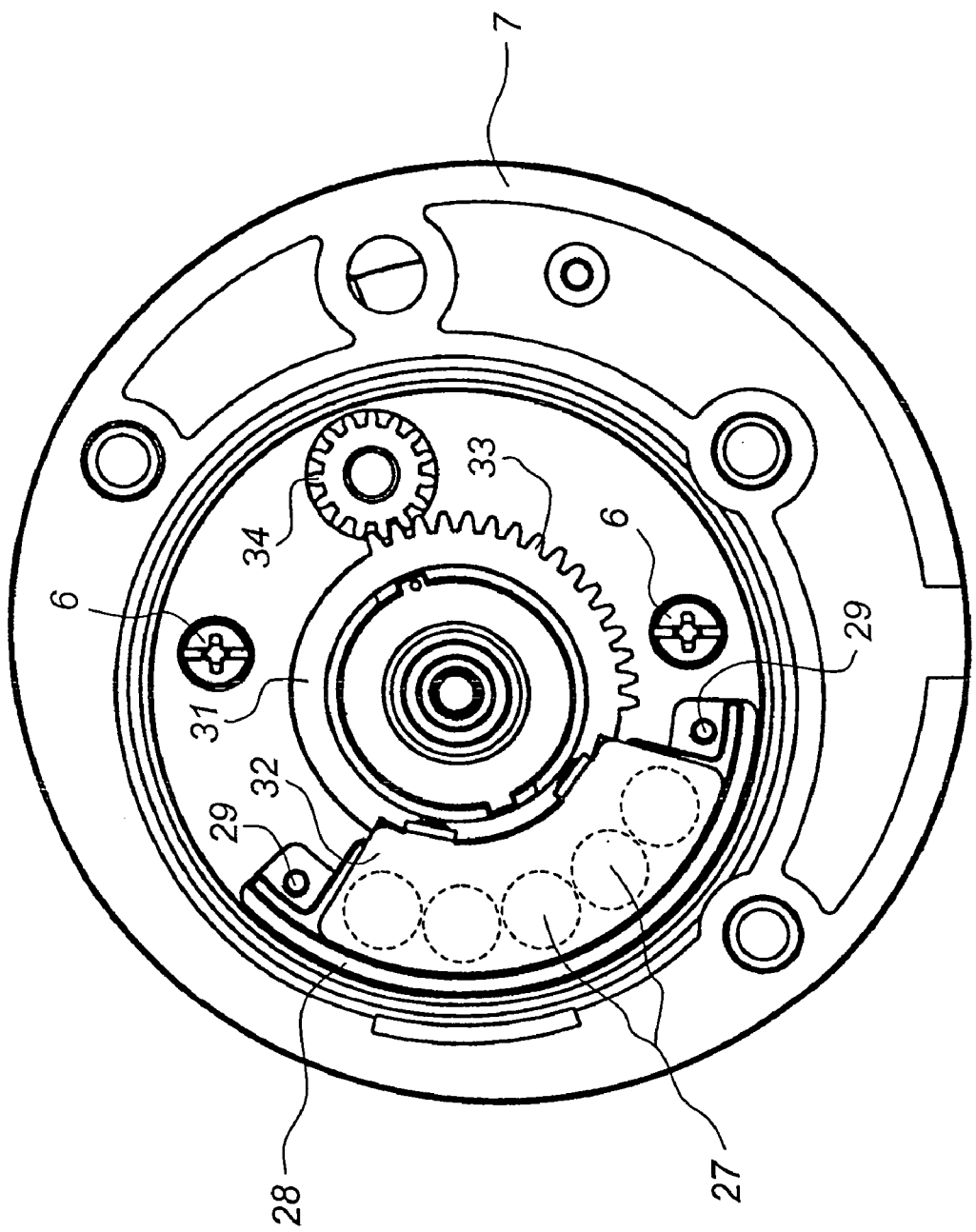
FIG. 4 is an end view and shows the components shown in FIG. 3 in an assembled position in the direction of arrow IV in FIG. 3, the magnetic brake being shown in its first position according to FIG. 1.
Figure 5:
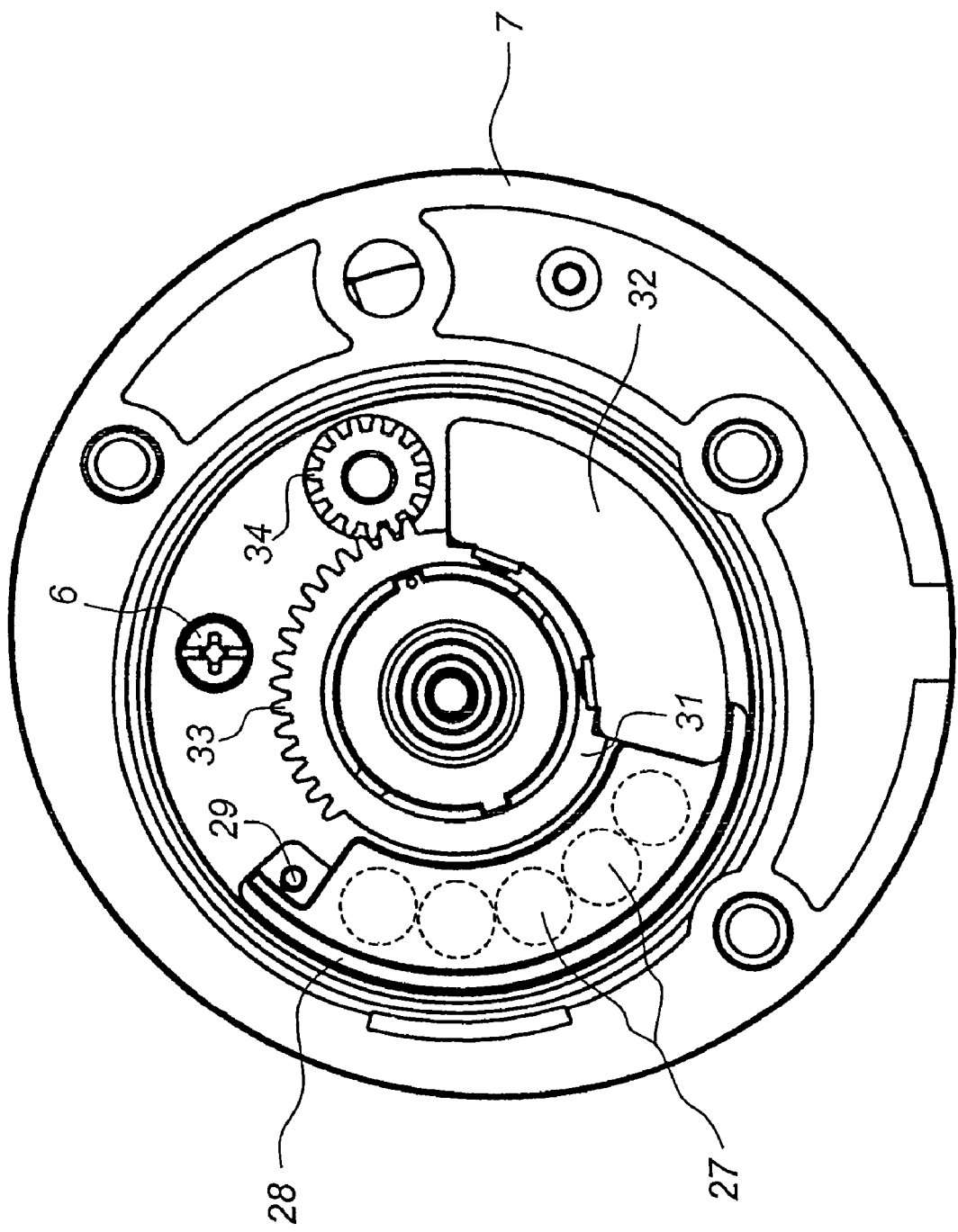
FIG. 5 corresponds to the FIG. 4 but shows the magnetic brake in a second position.
Figure 6:
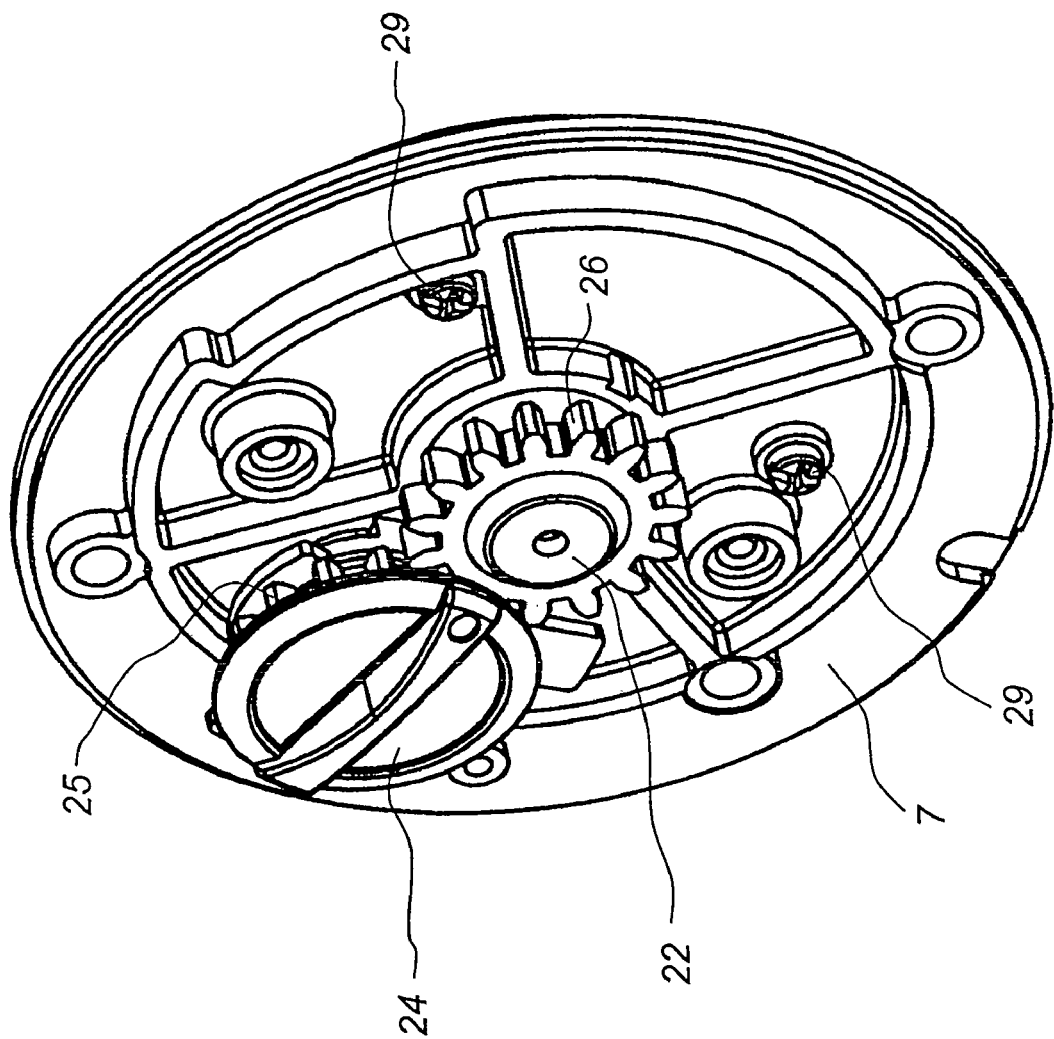
FIG. 6 is a perspective view and shows the components shown in FIGS. 4 and 5 from the opposite side, the side plate, the left one in FIG. 1, of the fishing reel being removed.

When turning the adjusting knob 24, its second toothing 34 makes, by way of the toothing 33, the wheel 31 turn for adjusting the braking effect of the magnetic brake on the line spool 4. When the adjusting knob 24 is in its first position (MIN), the shielding plate 32 is, due to the turning of the wheel 31, in a first position (FIG. 4), in which it is placed straight in front of the magnets 27 and completely shields the magnets in order to cancel their inductive cooperation with the end wall 4a of the line spool 4. When the adjusting knob 34 is turned to its second position (MAX), the wheel 31 and thus the shielding plate 32 are turned to a second position (FIG. 5), in which the shielding plate is moved aside and completely uncovers the magnets 27.

A desired braking effect on the line spool 4 thus is adjustable by the adjusting knob 24 being turned to a suitable position and both the mechanical brake and the magnetic brake will thus be set in the intended braking position—the mechanical brake by the sleeve 10 being pressed against the friction washer 16 by a force dependent on the turning position of the adjusting knob 24 and the magnetic brake by the shielding magnet 32 shielding the magnets 27 to a degree which is dependent on the turning position of the adjusting knob 24. It should also be noted that the braking effect of the two brakes on the line spool 4 is completely canceled when the adjusting knob 24 is in its first position (MIN). It should further be noted that the adjusting knob 24 with the toothings 25, 34, the sleeve 22 with the toothing 26, the hub portion 7a with its toothing and the wheel 31 with the toothing 33 are arranged in such a manner that turning of the adjusting knob 24 in one direction makes both the sleeve 22 and the wheel 31 turn for increasing the braking effect of the respective brakes on the line spool 4, and turning of the adjusting knob 24 in the other direction makes both the sleeve 22 and the wheel 31 turn for reducing the braking effect of the respective brakes on the line spool.

What I claim and desire to secure by Letters Patent is:

1. An induction magnetic brake for braking a line spool of a fishing reel, comprising:
   a frame, in which the line spool is supported rotatably about an axis of rotation, and two side plates which are mounted on the frame, the line spool having an end wall fixedly connected thereto and extending perpendicular to the axis of rotation, said magnetic brake having a plurality of permanent magnets presenting a magnetic surface area for each said magnet for inductive cooperation with the end wall of the line spool and an axially fixed magnet support carrying the magnets and located between one of said side plates and the end wall of the line spool, wherein the magnet support carries the magnets in a first plane perpendicular to the axis of rotation; and
   a shielding plate is arranged in a second plane which is perpendicular to the axis of rotation and located between the first plane and the end wall of the line spool, the shielding plate being movable in said second plane to cover and uncover said magnetic surface area to adjust magnetic braking effects thereof.

2. A magnetic brake as claimed in claim 1, wherein the shielding plate is movable perpendicular to the axis of rotation between a first relative position, in which the shielding plate is positioned straight in front of the magnets and completely shields the magnets to cancel their inductive cooperation with the end wall of the line spool, and a second relative position, in which the shielding plate is moved aside and completely uncovers the magnets.

3. A magnetic brake as claimed in claim 1, wherein the shielding plate is turnable about the axis of rotation to different positions.

4. A magnetic brake as claimed in claim 3, wherein the magnet support carries the magnets in such a manner that they are located at essentially the same radial distance from the axis of rotation.

5. A magnetic brake as claimed in claim 3, wherein an operating means, which is turnable about an axis parallel to the axis of rotation, is mounted on said one side plate and operable from the outside thereof and has a first tooth element meshing with a second tooth element which is arranged on the shielding plate, for providing, on turning of the operating means, relative turning of the shielding plate about the axis of rotation.

6. A magnetic brake as claimed in claim 1, wherein the magnet support is attached to said one side plate and the shielding plate is movable perpendicular to the axis of rotation.

7. A magnetic brake for a fishing reel, comprising:
   a frame;
   a line spool rotatably connected to the frame and rotatable about an axis, the line spool having an end wall;
   a support axially secured to the frame, the support being disposed in a first plane substantially perpendicular to the axis;
   at least one magnet secured to the support; and
   a shielding plate rotatably connected to the frame, the shielding plate being disposed in a second plane substantially perpendicular to the axis, wherein rotation of the shielding plate in the second plane exposes varying amounts of the at least one magnet to adjust an inductive braking effect of the at least one magnet on the end wall of the line spool.

8. A magnetic brake for a fishing reel according to claim 7, wherein
   the shielding plate is disposed between the support and the end wall of the line spool.

9. A magnetic brake for a fishing reel according to claim 7, wherein the shielding plate is made of iron.

10. A magnetic brake for a fishing reel according to claim 7, wherein the support is made of plastic.

11. A magnetic brake for a fishing reel according to claim 7, wherein
   the shielding plate is connected to a wheel, a portion of the wheel having teeth.

12. A magnetic brake for a fishing reel according to claim 11, wherein
   an adjusting knob disposed externally of the frame engages the teeth of the wheel
   to rotate the shielding plate.

13. A magnetic brake for a fishing reel according to claim 7, wherein
   the shielding plate is movable between a first position in which the at least one magnet is completely covered and a second position in which the at least one magnet is completely uncovered.

14. A magnetic brake for a fishing reel according to claim 7, wherein
   the at least one magnet is five magnets, each of the magnets being disposed substantially radially equidistant from the axis.

15. A brake system for a line spool of a fishing reel, comprising:
   a frame;
   a line spool rotatably connected to the frame and rotatable about an axis, the line spool having an end wall;
   a support rigidly secured to the frame, the support being disposed in a first plane substantially perpendicular to said axis;
   at least one magnet secured to the support;
   a shielding member rotatably connected to the frame and being disposed in a second plane substantially perpendicular to said axis, a portion of the shielding member having teeth, and a shielding plate extending from the shielding member;
   a mechanical braking member connected to the frame and axially movable along the axis, the mechanical braking member having teeth;
   an adjusting knob disposed externally of the frame, the adjusting knob having first and second sets of teeth, the first set of teeth engaging the mechanical braking member teeth to axially move the mechanical braking member and the second set of teeth engaging the shielding member teeth to rotate the shielding member such that rotation of the adjusting knob adjusts the inductive braking effect of the at least one magnet on the end wall of the line spool by rotating the shielding member to cover and uncover varying amounts of the at least one magnet with the shielding plate and adjusts the mechanical braking effect of the mechanical braking member by axially moving the mechanical braking member to press the mechanical braking member against the line spool with varying amounts of force.

16. A brake system for a line spool of a fishing reel according to claim 15, wherein
   the adjusting knob is movable between a first position in which the at least one magnet is completely covered by the shielding plate and the mechanical braking member is not pressing against the line spool and a second position in which the at least one magnet is completely uncovered by the shielding plate and the mechanical braking member is pressing against the line spool with maximum force.

17. A brake system for a line spool of a fishing reel according to claim 15, wherein
the shielding member is disposed between the support and the end wall of the line spool.

18. A brake system for a line spool of a fishing reel according to claim 15, wherein
the shielding plate is made of iron.

19. A brake system for a line spool of a fishing reel according to claim 15, wherein
the support is made of plastic.

20. A brake system for a line spool of a fishing reel according to claim 15, wherein
the at least one magnet is five magnets, each of the magnets being disposed substantially radially equidistant from the axis.

21. A fishing reel having a magnetic brake, said reel comprising:
a reel frame having a line dispensing direction;
a line spool connected to said frame and rotatable about a rotational axis substantially perpendicular to said line dispensing direction, the line spool having a magnetically interactive end wall;
a support secured to the frame in a first plane substantially perpendicular to said rotational axis and axially fixed along said rotational axis, said support further comprising at least one magnet associated therewith that presents a magnetic surface area toward said magnetically interactive end wall for inducing a magnetic braking effect against relative rotation therebetween; and
a shielding plate disposed in a second plane substantially perpendicular to said rotational axis and connected to said frame to be axially fixed along said rotational axis, whereby relative rotation between said shielding plate and said at least one magnet on said support exposes or covers said magnetic surface area to present more or less magnetic braking effect, respectively, against said end wall due to interaction between said magnetic surface area and said magnetically interactive end wall of the line spool.

22. A magnetic brake for a fishing reel according to claim 21, wherein
the shielding plate is disposed between the support and the end wall of the line spool.

23. A magnetic brake for a fishing reel according to claim 21, wherein
the shielding plate is made of iron.

24. A magnetic brake for a fishing reel according to claim 21, wherein
the support is made of plastic.

25. A magnetic brake for a fishing reel according to claim 21, wherein
the shielding plate is connected to a wheel, a portion of the wheel having teeth.

26. A magnetic brake for a fishing reel according to claim 25, wherein
an adjusting knob disposed externally of the frame engages the teeth of the wheel to rotate the shielding plate.

27. A magnetic brake for a fishing reel according to claim 21, wherein
the shielding plate is movable between a first position in which the at least one magnet is completely covered and a second position in which the at least one magnet is completely uncovered.

28. A magnetic brake for a fishing reel according to claim 21, wherein
the at least one magnets are substantially radially equidistantly disposed from said rotational axis.

\* \* \* \* \*